July 23, 1968   TATSUSHI KITANOSONO ET AL   3,393,621
ELECTROMOTIVE SHUTTER FOR PHOTOGRAPHIC CAMERA
Filed June 8, 1964 2 Sheets-Sheet 1

INVENTORS
T. KITANOSONO and T. GOSHIMA
BY
ATTORNEY

United States Patent Office 3,393,621
Patented July 23, 1968

3,393,621
ELECTROMOTIVE SHUTTER FOR
PHOTOGRAPHIC CAMERA
Tatsushi Kitanosono and Takeshi Goshima, Tokyo, Japan, assignors to Canon Camera Kabushiki Kaisha, Tokyo, Japan, a corporation of Japan
Filed June 8, 1964, Ser. No. 373,382
Claims priority, application Japan, June 12, 1963, 38/31,455
3 Claims. (Cl. 95—11.5)

This invention relates to electromagnetically operated shutters for photographic cameras. The known structures of certain types of electromagnetically operated shutters have the disadvantage of requiring mechanical cooperation between the winding and the release operations as in conventional mechanically operated shutter structures, such structures resulting in a complex and cumbersome mechanism which does not lend itself to quick and easy handling in operation.

One of the objects of this invention is to provide a simply constructed electromagnetically operated shutter which can be released precisely and easily upon actuation of an electrical switch without the necessity of any winding operation between exposures.

Another object of this invention is to provide an electromagnetically operated shutter which comprises a normally closed first shutter and a normally opened second shutter in which the first shutter is opened electrically and the second shutter is sequentially closed to cover the aperture made by the first shutter, and in which the starting time of the actions of the two shutters is electrically controlled so as to obtain the desired exposure time and aperture size.

A further object of the invention is to provide an electrically operated shutter which can easily be switched over to flash photographic operation. Other objects, advantages and features of this invention will become more apparent from the following description of an illustrative embodiment in conjunction with the drawing in which.

Figure 1:
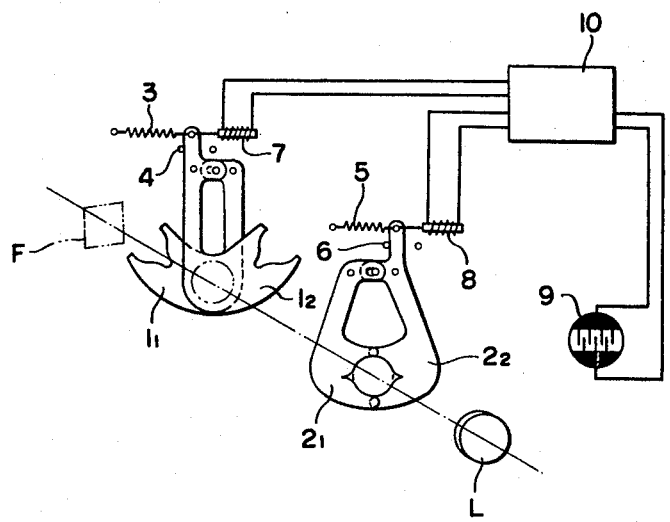
FIG. 1 illustrates diagrammatically the structure of an embodiment according to the present invention.
Figure 2:
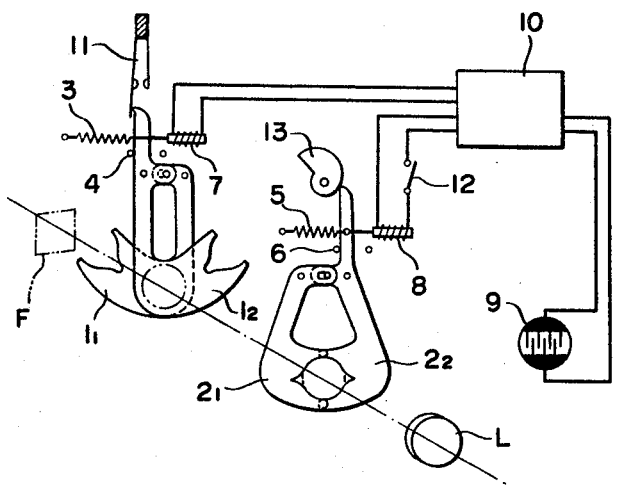
FIG. 2 illustrates diagrammatically the structure of a second embodiment connected to a flash mechanism.

Referring to FIGS. 1 and 2, light from lens L arrives at the film surface F through two apertures made by a first pair of shutter blades $1_1$, $1_2$ and a second pair of shutter blades $2_1$, $2_2$, respectively, the shutter blades being pivotally mounted, the blades of each pair being pivotally interconnected by a pin and slot connection as illustrated. The first shutter blades $1_1$, $1_2$ are normally held by spring 3 to engage with the stop 4 to close the aperture. The second shutter blades $2_1$, $2_2$ are normally held by spring 5 to engage with the stop 6 to open the aperture. 7 and 8 denote the electro-magnets that actuate the first and second shutters against the bias of springs 3 and 5, respectively. 9 denotes a photographic cell such as CdS, and 10 denotes a controller.

When the photographic cell receives light from scene and the release switch, not shown but mounted on the controller 10 or connected to the same, is closed, the electro-magnets 7, 8 are energized, first, to open the first shutter blades $1_1$, $1_2$ so as to begin exposure, and then to shut the second shutter blades $2_1$, $2_2$ so as to block the aperture made by the first shutter $1_1$, $1_2$.

The appropriate exposure time and shutter aperture size are obtained by the suitable time lag between the opening and shutting movement of the first and second shutters. The exposure is achieved automatically by the differential movement of the shutter blades which are controlled by the controller 10 controlling the current to the electro-magnets 7, 8 in accordance with the current from the photo-cell 9 which functions in accordance with the scene brightness.

Figure 3:
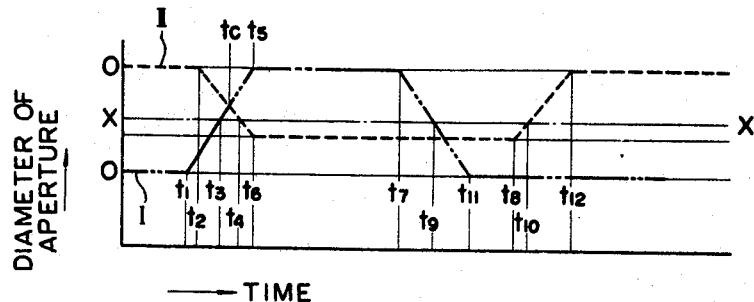
FIGS. 3 and 4 illustrate diagrams analyzing the performance of the first embodiment.
Figure 4:
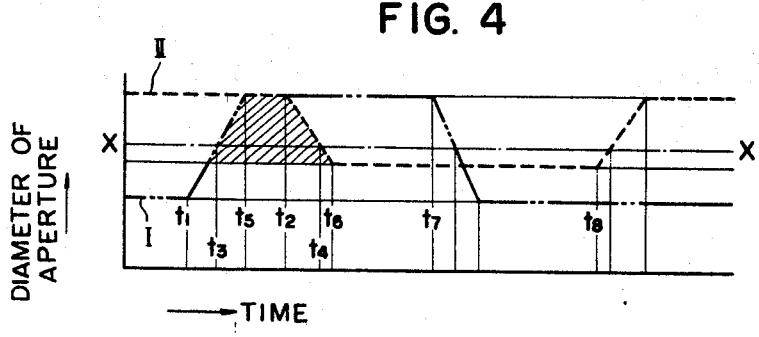

FIGS. 3, 4 illustrate a diagram analyzing the performance of the first embodiment of the invention described. The diameter of the aperture is shown on the ordinate and the time on the abscissa. The operation curves I, II, of the first and second pair of shutter blades are shown on the both sides of the line X—X, which shows the aperture diameter as being zero. The horizontal line 0 above the line X—X indicates the opening of a pair of shutter blades while the horizontal line 0 below the line X—X indicates the closing of a pair of shutter blades. As mentioned above, the first pair of shutter blades are closed before release as shown $0-t_1$ (curve I), while the second pair of shutter blades are open as $0-t_2$ (curve II). When the release switch is closed, the current flows through into the electro-magnet 7 to cause the first pair of shutter blades $1_1$ and $1_2$ to begin the opening movement. At $t_3$, the first pair of shutter blades begins to open, and at $t_5$ reaches the largest diameter, which is held while the electromagnet 7 is energized.

On the other hand at $t_2$, later than $t_1$, the current flows through the electric magnet 8 to cause the second pair of shutter blades $2_1$, $2_2$ to begin the closing movement, and completely close at $t_4$ and remain so until a still later time $t_6$. During the opening and closing movements of the two pairs of shutter blades, the two apertures controlled by the two pairs of shutter blades have the same area at time $t_c$. Thereafter, the second pair of shutter blades begin to cover the aperture formed by the first pair of shutter blades and at time $t_4$, the aperture made by the first pair of shutter blades is covered. Accordingly, the area embraced by $t_3-t_c-t_4$ shows the variation of the diaphragm aperture and the distance between $t_3$ and $t_4$ shows the exposure time. The aperture diameter and exposure time shown by the shadowed area in FIG. 4 can be obtained by controlling the starting time $t_2$ of the second pair of shutter blades in accordance with the photoelectric current developed by the photo cell 9.

After exposure, the first and second pair of shutter blades are kept in their respective released positions until time $t_7$, $t_8$, respectively. Upon deenergization of the electromagnets 7, 8, the two pairs of shutter blades are returned to their first positions at times $t_{11}$ and $t_{12}$, respectively by their springs 3 and 5. The times $t_7$ and $t_8$ are selected to open the second pair of shutter blades after the first pair of shutter blades is completely closed, thus avoiding any occurrence of an exposure during the return movement of the shutter blades.

Furthermore, to obtain a small aperture diameter it is desirable for the first pair of shutter blades to begin to open when the second pair of shutter blades makes a small aperture. To this end, the first pair of shutter blades $1_1$, $1_2$ have large overlapping parts (FIG. 1) to provide a suitable time lag between the time when the electromagnet is first energized and when the shutter blades sweep past each other to form an aperture between the overlapping bifurcated ends.

There are other suitable means for this purpose such as through the use of a governor to slow down the motion of the first shutter blades in its initial movement or to make the motion of the first pair of shutter blades slower than that of the second pair of shutter blades, by making the power of electro-magnet 7 weaker than that of electromagnet 8. It will be understood that the form and number of the shutter blades need not be limited to those shown in the drawings.

FIG. 2 illustrates an arrangement of a second embodiment of an electromagnetically operated shutter connected to a flash. Generally, shutter speed of $\frac{1}{30}$–$\frac{1}{15}$ sec. is suitable for flash photography, so it is desirable to use the first pair shutter blades as a usual shutter effecting the opening and shutting movement and the second pair of shutter blades $2_1$, $2_2$ as a diaphragm. In this construction there is provided a synchronizing contact 11 cooperating with the first pair of shutter blades to close and open the flash bulb circuit (not shown). A switch 12 is connected in the circuit of the electromagnet 8 acting on the second pair shutter blades so as to cut off the second shutter circuit under a flash exposure. There is also provided a manually set cam member 13 to keep the second shutter aperture open.

Figure 5:
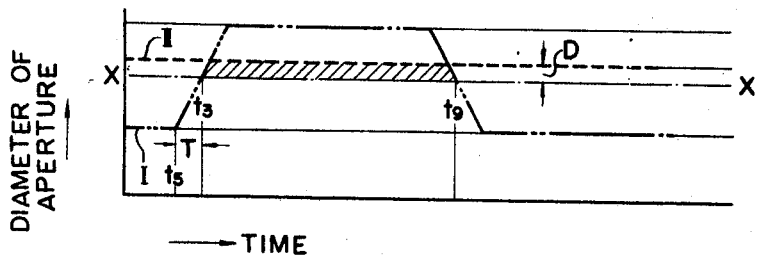
FIG. 5 illustrates a diagram analyzing the performance of the second embodiment of the invention under flash operation.

The exposure obtainable with the circuitry illustrated in FIG. 2, is diagrammatically shown by the shadowed area in FIG. 5 during the exposure time $t_3$–$t_9$. The second shutter aperture is pre-set at a value D shown in FIG. 5 by manually setting of the cam 13 and exposure is made when the first pair of shutter blades begins to open upon the closure of the release switch. To ignite the flash bulb, the time lag T between $t_s$, the time synchronizing switch II in the flash circuit is closed, and $t_3$, the time when the aperture created by the first pair of shutter blades begins to open, is effectively adjusted by adjusting the mechanically cooperable parts between the contact 11 and the first pair of shutter blades $1_1$, $1_2$ or by an electrical adjustment in the flash circuit. It will be readily appreciated that the electromagnetically operated shutter according to the present invention may be readily adapted for flash photographic operation.

It will be understood that this invention is not limited to the specific embodiments described above and illustrated in the drawing, but can be carried out with various modifications without departing from the scope of the invention, as defined in the appended claims.

What is claimed is:

1. Electrically operated shutter for a camera, comprising a first shutter normally closed and a second shutter normally opened, electrical means for opening the first shutter and closing the second shutter, the movements of said shutters being opposite to each other, said electrical means including first and second electromagnets for the first and second shutters, respectively, means for controlling the time lag between the energization of the first and second electromagnets to provide a time lag between the starting time of opening the first shutter and the starting time of closing the second shutter to obtain simultaneously a desired aperture size and exposure time, means to preset the aperture provided by the second shutter, a synchronizing flash contact, and means to close the synchronizing flash contact upon opening the first shutter.

2. Electrically operated shutter according to claim 1, wherein a switch inserted in the circuit of the second electromagnet is adapted to open its circuit for flash exposure, and wherein a manually adjustable cam is provided cooperating with the second shutter to set the aperture area formed by the second shutter.

3. Electrically operated shutter for a camera comprising, a first pair of cooperating shutter blades forming a first aperture which is normally closed, a second pair of cooperating shutter blades forming a second aperture which is normally open and cooperating with the aperture of the first pair of shutter blades, biasing means for each of said pair of shutter blades for biasing their respective pair of shutter blades to their normally closed and open positions, a first electromagnet for said first pair of shutter blades and a second electromagnet for said second pair of shutter blades for moving their respective pairs of shutter blades to open and closed positions against the bias of their respective biasing means, electrical means for controlling the sequential energization and deenergization of the first and second electromagnets to provide a time lag between the starting instant for movement of the first pair of shutter blades to their open position and the starting instant for movement of the second pair of shutter blades to their closed position upon energization of the first and then the second electromagnets to obtain a desired aperture size and exposure time, and provide a time lag between the instant of deenergization of the first electromagnet and deenergization of the second electromagnet to maintain the second pair of shutter blades closed until the first pair of shutter blades are closed by its biasing means, a synchronizing flash switch operated by the movement of the first pair of shutter blades, a manually adjustable cam cooperating with the second pair of shutter blades to preset the second aperture opening formed by the second pair of shutter blades, and a switch in the circuit of the second electromagnet to open its circuit during a flash exposure.

References Cited

UNITED STATES PATENTS

| 2,344,382 | 3/1944 | Aiken | 95—63 |
| 2,917,982 | 12/1959 | Martin | 95—62 |
| 3,200,723 | 8/1965 | Topaz | 95—10 X |

JOHN M. HORAN, *Primary Examiner.*